United States Patent [19]

Olsen

[11] Patent Number: 5,758,069
[45] Date of Patent: May 26, 1998

[54] ELECTRONIC LICENSING SYSTEM

[75] Inventor: James E. Olsen, Park City, Utah

[73] Assignee: Novell, Inc., Orem, Utah

[21] Appl. No.: 620,319

[22] Filed: Mar. 15, 1996

[51] Int. Cl.$^6$ .................................................. H04L 9/00
[52] U.S. Cl. .......................... 395/187.01; 395/188.01; 395/186; 380/4; 380/25
[58] Field of Search ........................ 395/187.01, 186, 395/188.01, 609; 380/4, 25

[56] References Cited

U.S. PATENT DOCUMENTS

| | | | |
|---|---|---|---|
| 4,870,568 | 9/1989 | Kahle et al. | 395/605 |
| 4,924,378 | 5/1990 | Hershey | 395/187.01 |
| 4,937,863 | 6/1990 | Robert et al. | 380/4 |
| 4,941,175 | 7/1990 | Enescu et al. | 380/4 |
| 5,023,907 | 6/1991 | Johnson et al. | 380/4 |
| 5,047,928 | 9/1991 | Wiedemer | 380/4 |
| 5,103,476 | 4/1992 | Waite et al. | 380/4 |
| 5,138,712 | 8/1992 | Corbin | 395/186 |
| 5,182,770 | 1/1993 | Medveczky et al. | 380/4 |
| 5,187,770 | 2/1993 | Mishima et al. | 385/145 |
| 5,201,048 | 4/1993 | Coulter et al. | 395/603 |
| 5,204,897 | 4/1993 | Wyman | 380/4 |
| 5,222,134 | 6/1993 | Waite et al. | 380/4 |
| 5,260,999 | 11/1993 | Wyman | 380/4 |
| 5,265,065 | 11/1993 | Turtle | 395/604 |
| 5,278,980 | 1/1994 | Pedersen et al. | 395/604 |
| 5,287,408 | 2/1994 | Samson | 380/4 |
| 5,319,705 | 6/1994 | Halter et al. | 380/4 |
| 5,343,526 | 8/1994 | Lassers | 380/4 |
| 5,343,527 | 8/1994 | Moore | 380/4 |
| 5,349,642 | 9/1994 | Kingdon | 380/25 |
| 5,371,792 | 12/1994 | Asai et al. | 380/3 |
| 5,375,206 | 12/1994 | Hunter et al. | 395/712 |
| 5,386,369 | 1/1995 | Christiano | 364/464.1 |
| 5,438,508 | 8/1995 | Wyman | 395/208 |
| 5,500,513 | 3/1996 | Langhans et al. | 235/380 |
| 5,553,139 | 9/1996 | Ross et al. | 380/4 |
| 5,579,222 | 11/1996 | Bains et al. | 395/712 |
| 5,621,201 | 4/1997 | Langhans et al. | 235/380 |

FOREIGN PATENT DOCUMENTS

| | | |
|---|---|---|
| A-38209 | 4/1993 | Australia . |
| A-48113 | 3/1994 | Australia . |
| WO 89/04520 | 5/1989 | WIPO . |
| WO 92/20021 | 11/1992 | WIPO . |

*Primary Examiner*—Robert W. Beausoliel, Jr.
*Assistant Examiner*—Ly V. Hua
*Attorney, Agent, or Firm*—Snell & Wilmer, L.L.P.

[57] ABSTRACT

A licensing system provides enhanced flexibility for licensing applications in a network. The licensing system includes a license certificate database which stores all license information. The license certificate database is accessed by providing a request to a license service provider associated with a server. The license service provider generates an executable entity based on the request parameters, which searches the database and, if the appropriate units are available, assembles a license. The license and the application are then transmitted to the requesting client. All aspects of the transaction are also stored in a database organized according to a transaction's relation to a particular license.

19 Claims, 6 Drawing Sheets

ELECTRONIC LICENSING SYSTEM

BACKGROUND OF THE INVENTION

1. Field of the Invention

The invention relates to licensing software, and more particularly, to licensing software electronically in a network environment.

2. Description of the Related Art

Most software vendors currently favor licensing as the preferred method of distributing software. Licensing software provides the vendor with a certain amount of control over the distributed software which may be used to the vendor's advantage. For example, licensing software allows the vendor to prohibit unauthorized usage of the software that might facilitate unauthorized copying. In addition, licensing provides an advantageous method of providing and billing for software. Through licensing, the vendor may sell several identical copies of the same software and charge the buyer for each copy.

Licensing schemes have adapted to the network environment as well as the individual personal computer. In a network environment, such as a client-server network, multiple users may access the same copy of a particular application. Consequently, the vendor can charge the network owner not for the number of copies installed on the network, but for the number of users having access to the software.

Software is conventionally licensed using an agreement between the vendor and the user or administrator. The agreement is typically either a conventionally signed contract or a "shrink wrap" agreement attached to the packaging for the software, to which the licensee acknowledges agreement by opening the package.

Although traditional licensing and shrink wrap licensing are more or less applicable to licensing for individual systems, they are not well-suited to the network environment. Both traditional and shrink wrap licensing schemes are difficult to enforce on a network where several users have access to the software. Consequently, various electronic systems have been devised for controlling access to software on a network.

Electronic licensing typically comprises providing a set of criteria under which a request for an application from the server should be granted. One common licensing system uses a fixed set of licenses controlled by a license server. The license information is maintained in a license database, along with information regarding which applications are in use and how many units are still available. The information in the database may be encrypted to prevent forgeries. When an application is desired, the application commences running. Code embedded in the application initially requests a license from the server to facilitate the execution of the application. The server checks the database of licenses, and if the appropriate licenses are available, grants the request. As requests are received and licenses granted, the relevant information is logged into a file to track usage of the various applications.

If a license is not available, the client contacts another server to find the appropriate license. The client in the conventional system has the responsibility to obtain licenses from the various servers, and the individual servers provide resources at the client's request. To facilitate such licensing, the application typically includes a library of programs designed to contact the server, request a license, and track the resulting license.

Although such a licensing system provides some security against unauthorized usage of applications, it suffers several drawbacks. For example, the number of programs required for the client to request and maintain licenses occupies a significant portion of the client's valuable memory resources. Further, a conventional licensing system stores most of the licensing information in the client's memory. Consequently, in the event of a client crash, the licensing information is lost and difficult to reconstruct.

Conventional licensing systems also suffer limited scalability. When a call is made to a server, all of the execution occurs on each individual server for any particular call. Similarly, if a license is located on a particular machine, all execution necessary to operate on that license occurs on that machine. Consequently, a central server containing most of the licenses available on a particular network may be overworked while other, more local server resources remain idle.

In addition, conventional licensing systems rely on code embedded in the application to establish the licensing attributes. Code is placed in the application which interprets information received from the server to establish licensing parameters. Because the behavior of the license is not established until after the request has been made and the license obtained, the user cannot read the license terms prior to the request. In addition, this system lacks flexibility. To change the licensing terms, the code in the application must be revised.

An electronic software licensing system is thus needed which overcomes the shortcomings of the prior art.

SUMMARY OF THE INVENTION

An electronic licensing system according to various aspects of the present invention provides alternative methods and apparatus for licensing software in a network environment. License information is suitably stored in a distributed database among several servers. The license information may be coupled with any suitable attributes to create a desired licensing policy. Clients are equipped with a suitable library of application programming interfaces (APIs) for acquiring and managing licenses. To request an application, the client assembles a request having the desired license criteria, such as the publisher, product, version, and number of license units. This information is provided with other relevant information, such as the user's name.

When the request for a license to an application is received by a local server, the server searches the local database for license information which satisfies the request criteria. The server also suitably passes the request to other servers to check their respective databases. If the requested license rights are available, the license service provider (LSP) constructs a license certificate object and collects those rights into the object. When this object is created, it is associated with the client request, suitably by a name referred to as a license handle, and adjusts the information in the database to reflect the granting of the license.

In a system according to a preferred embodiment of the present invention, most of the license transactions occur at the servers; the client merely bundles the arguments for a license request and transmits them to the server. Consequently, the client resources required for the license system are relatively small.

In accordance with a further aspect of the present invention, recoverability of the system is enhanced. To anticipate a client crash, the client only needs to store the license handle associated with the license request. The remaining information is stored in the server database, and may be reestablished by finding the particular transaction associated with the license handle in the database.

In accordance with yet a further aspect of the present invention, licensing flexibility is also enhanced. The licensing criteria may be adjusted by revising the contents of the database and the client APIs. Because the application requires no particular code to facilitate licensing, recompilation or relinking of the application binaries is unnecessary to change the licensing attributes. In addition, the structure of the database and the APIs facilitates the use of unconventional licensing modes by applying various different criteria to the license information in the database and the license request. Further, the distributed nature of the database provides enhanced scalability and allows several servers to be searched with a single request from the client.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which:

DETAILED DESCRIPTION OF PREFERRED EXEMPLARY EMBODIMENTS

Figure 1:
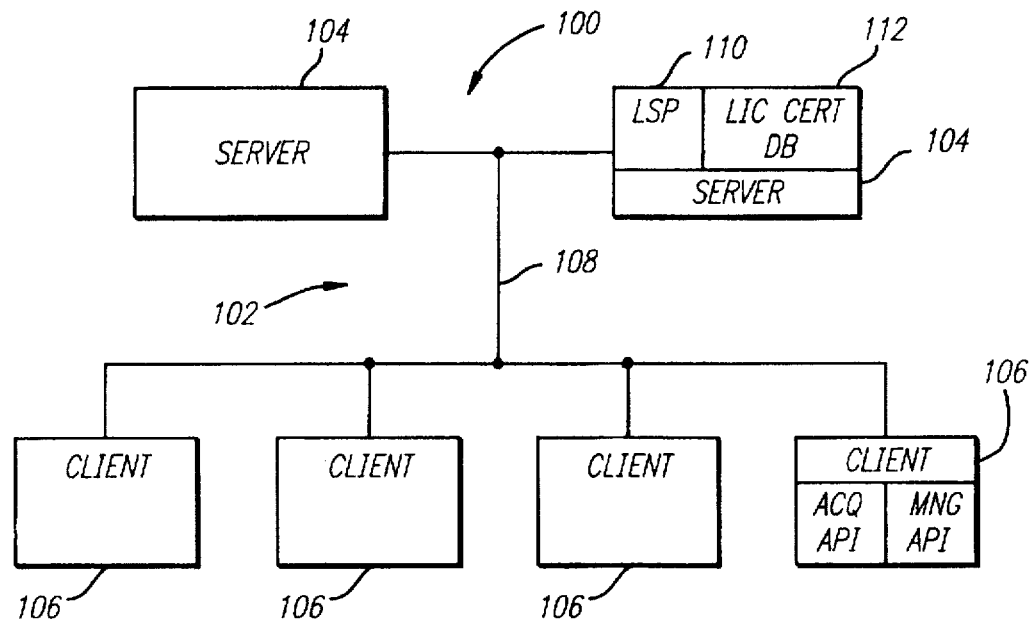
FIG. 1 is a block diagram of a network according to various aspects of the present invention.

A licensing system according to the present invention provides a flexible and robust licensing apparatus and method for licensing software in a network. Referring now to FIG. 1, a licensing system 100 according to various aspects of the present invention suitably includes a network 102 comprising at least one server 104, at least one client 106, and a communications system (e.g., network bus) 108. Server 104 suitably comprises a high-speed computer operating on a Novell NetWare server operating system. If multiple servers are present, servers 104 are suitably configured in a distributed processing configuration.

Server 104 includes a LSP 110 for performing license transactions and a license certificate database 112. LSP 110 performs several licensing functions, for example receiving requests from clients 106 and maintaining and searching license certificate database 112 to create license certificate objects. LSP 110 may be implemented in software, suitably comprising a NetWare Loadable Module in the Novell NetWare 4.1 environment.

Figure 2:
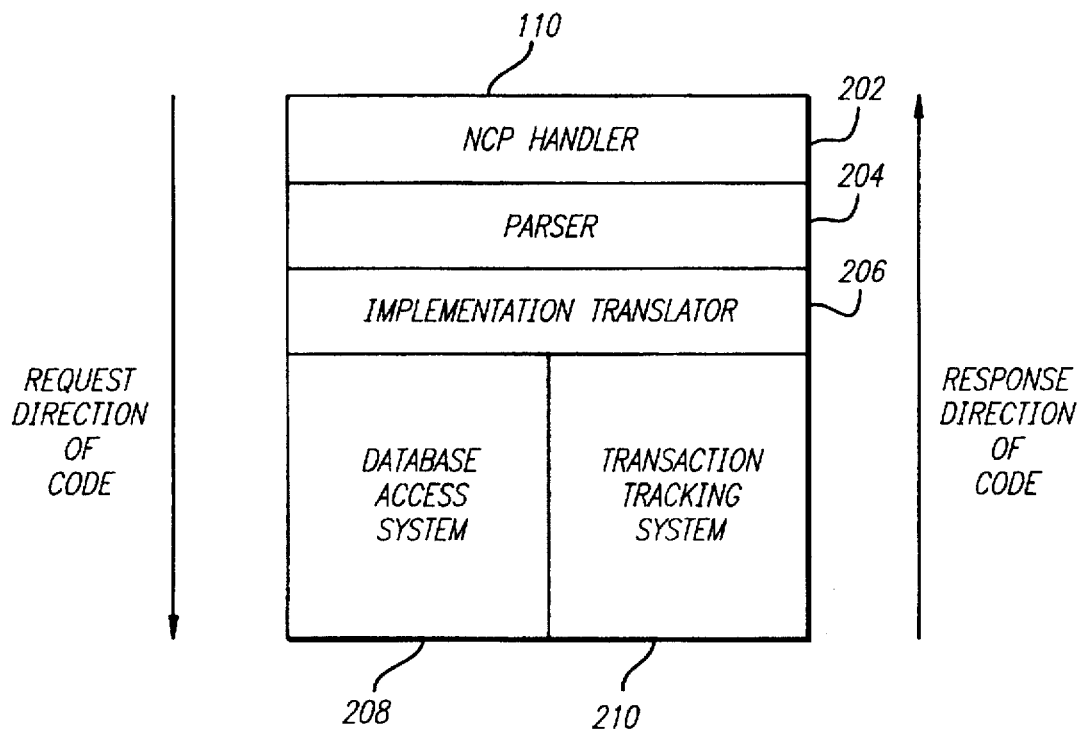
FIG. 2 is a block diagram of the LSP of FIG. 1.

Referring now to FIG. 2, LSP 110 suitably comprises a NetWare Core Protocol (NCP) handler 202; a parser 204; an implementation translator 206; a database access system 208; and a transaction tracking system 210. NCP handler 202 receives messages from clients relating to various licensing functions. To handle multiple messages, NCP handler 202 suitably processes several requests concurrently. NCP handler 202 notes the message contents, as well as the source of the message to establish a return location.

The message received by NCP handler 202 is transmitted to parser 204. Parser 204 initially determines which particular function is requested and converts the message into an appropriate format for other components of server 104. Based on the type of transaction, parser 204 then parses out the appropriate arguments from the message and transfers the results to implementation translator 206.

Implementation translator 206 first checks all arguments for validity, and if any arguments fail, returns a rejection message to client 106. If the arguments are valid, implementation translator 206 translates the arguments into the appropriate request for licenses from database access system 208. In addition, implementation translator 206 translates results from database access system 208 and returns the appropriate error codes to client 106. Finally, if database access system 208 cannot locate the necessary license certificate objects in the local license certificate database, it submits requests to other LSPs to attempt to locate the necessary license certificate objects.

Database access system 208 receives requests from implementation translator 206 and locates, obtains, and manages license certificates in license certificate database 112. Database access system 208 suitably includes code for accessing license certificate database 112 both locally and in remote LSPs. The process for accessing and creating licenses from the database is described in detail below.

To access license certificate database 112 to perform various functions, database access system 208 suitably assembles a license certificate object for each license certificate installed in license certificate database 112. A license certificate object suitably comprises code for performing various functions within license certificate database 112, such as adding, removing, requesting, and releasing a license certificate. In addition, the license certificate object suitably provides information regarding the corresponding license certificate and its state. For example, based on the user information or a license handle, the license certificate object suitably locates the corresponding license certificate and transmits information relating to the current users, number of units in use, identifier information, default update period, ownership information, and the like.

The license certificate object also suitably performs various license management functions. For example, the license certificate object facilitates adding assignment information to license certificates to assign or delete particular users to an application for access. In addition, ownership of the license may be transferred to another user or group using the license certificate object.

The license certificate object also provides for removal of stale entries. The license certificate object monitors updates received from the various clients 106 to indicate that the application is still in use. As described further below, if the update is not received within the appropriate update interval, the license certificate object terminates the license by performing a release operation. This allows the enhancement of license certificate capabilities without affecting the API implementation code.

Transaction tracking system 210 tracks the usage history of licensing system 100. Transaction tracking system 210 suitably includes a transaction database, which stores relevant usage information, such as when licenses are consumed, when updates occur, when license units are released, and error conditions. Transaction tracking system 210 suitably organizes information relating to licenses in transactional records based on each license handle. For example, information relating to each transaction affecting or based on a particular license handle is recorded in a transaction record devoted to that license handle. Consequently, unlike a chronological log, determining the usage history of a particular application does not require a search of an entire database. In contrast, all of the relevant information is stored in a record having an identifying license handle.

Referring again to FIG. 1, license certificate database 112 suitably comprises any database capable of storing license information. For example, license certificate database 112 may be generated with a commercially available database system, such as BTrieve. License certificate database 112 stores all of the information relating to the various licenses available via LSP 110. The format of license certificate database 112 is suitably configured to conform to that of the various license certificates.

The information in license certificate database 112 is suitably organized into license records, each of which suitably contains a license certificate supplied by a vendor or other installer along with additional information relating to, for example, the location of assignment information and user information. The license certificate is stored in the record in a block copy fashion, so that all of the data and structure of the certificate are preserved. Additional space is also suitably provided for information required by licensing system 100. For example, space may be added to the record for entry of information relating to the user, license handle, number of license units consumed, the last time of update, assignment, and owner. Each license record is suitably extendable by adding additional identifiers that may be recognized by certificate objects.

Figure 3:
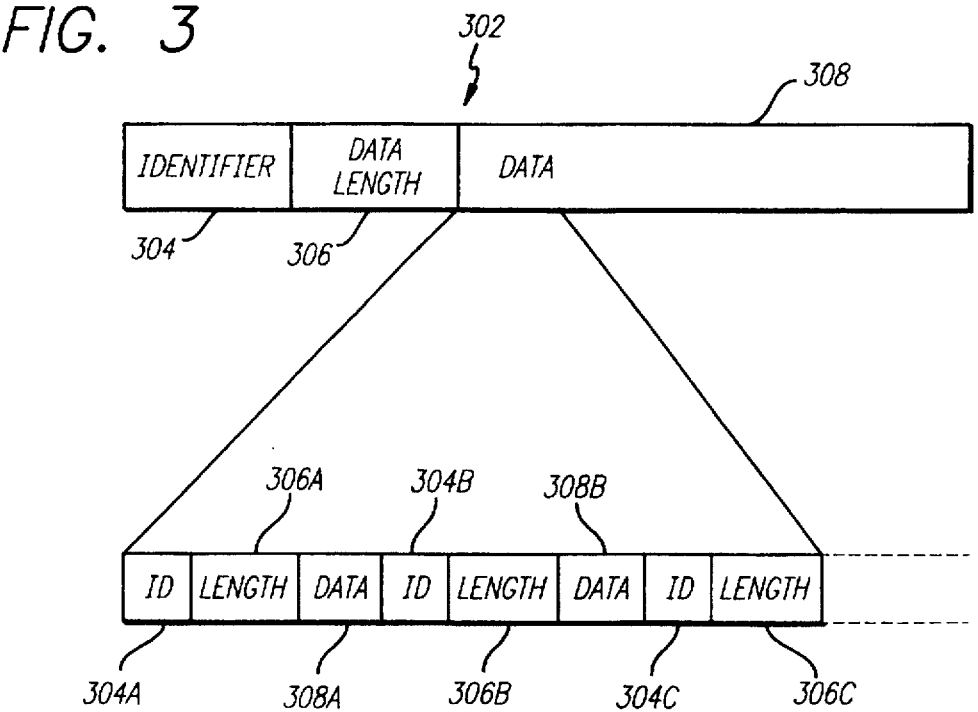
FIG. 3 is a diagram of the organization of a license record.

The license information stored in license certificate database 112 is suitably stored in a format common to each license. Referring now to FIG. 3, a suitable format for a license record 302 comprises an identifier field 304, a data length field 306, and a data field 308. A suitable identifier is stored in identifier field 304, for example to identify the nature of license record 302. Data length field 306 describes the length of data field 308, suitably in bytes. Data length field 306 suitably comprises a four byte number, for example in little endian format. Data length field 306 may be read to determine where the current license record 302 ends and where the next license record 302 begins.

Data field 308 suitably contains information specific to the license. Data field 308 is formatted in any suitable manner to be compatible with licensing system 100. In particular, data filed 308 suitably contains nested sets of identifiers, data length fields, and data fields for various characteristics and variables associated with the license record. For example, each entry in the data field suitably includes an identifier 304A–C which indicates the type of information in the entry, e.g. an error attribute, ownership data, etc. A data length field 306 A–B indicates the length of the entry, and a data field 308A–B includes the actual information. The format may suitably be determined according to a portion of the identifier, so that if licensing system 100 does not recognize the relevant portion of identifier field 304, data field 308 is ignored. The information stored in data field 308 is provided by license installation or creation, as described further below.

Referring again to FIG. 1, client 106 suitably comprises a conventional network terminal, for example a personal computer or work station. Client 106 is connected to server 104 through a conventional network interface. To operate in conjunction with licensing system 100, client 106 suitably includes a series of application programming interfaces (APIs). The specific APIs provided may conform to the particular platform on which client 106 operates.

The APIs are suitably provided to client 106 by a client provider or library. The client provider, suitably comprising a module loaded into each client 106, provides the licensing APIs and a remote procedure call (RPC) mechanism for client 106. Client 106 requests access to and manages applications using the APIs. The RPC mechanism both locates and communicates to LSPs 110. Finally, the client provider also suitably performs various library maintenance routines as may be necessary for the various shared library formats.

Client 106 uses a series of functions gathered in the APIs furnished by the client provider to request licenses from LSP 110. The APIs are suitably linkable or addressable entities according to the particular platform used by client 106. The licensing API library associated with client 106 is suitably configured in a standard format, for example, the industry standard called the LSAPI (v1.1), jointly created by Novell, Microsoft, HP/Gradient, and several other companies. The APIs generally provide for the acquisition and management of the licenses. Client 106 according to various aspects of the present invention suitably includes at least two library sets. The first library set provides the license acquisition API, and the second is the license management API.

The license acquisition API provides for obtaining, maintaining, and releasing license units corresponding to a particular application. The license acquisition API preferably provides license acquisition functions compatible with a broad array of platforms employed by licensing system 100 platform so that software developers are afforded considerable flexibility in designing applications which may be conventionally licensed in the context of licensing system 100. Preferably, the application requires very little information about licensing system 100's particular process for acquiring and constructing licenses.

The calls used to provide this functionality suitably correspond to industry standard APIs, such as the common licensing API, or LSAPI, version 1.1, as described above. The standard API allows a server 104 to license applications independent of the underlying licensing system 100. The license acquisition API facilitates requesting, updating, and releasing licenses, establishing the update period for licenses, and translating error codes.

The license management API suitably provides access to information that directly pertains to the license acquisition process. In addition, the license management API also suitably provides for configuring and examining licensing system 100. The license management API is useful as an administrative tool and in a software management system. The license management API facilitates determination of, for example, license usage, license restrictions, license installation and information, and transactional records. Further, the license management API suitably provides calls for adding and removing license units from a license certificate, transferring ownership, and installing a license certificate either into licensing system 100 or onto a specific LSP 110.

Communications system 108 suitably comprises a series of transmission channels connecting servers 104 and clients 106, including various supporting hardware and software. Communications system 108 facilitates communications between two or more servers 104 and between servers 104 and clients 106. Communications system 108 comprises any suitable communications medium, such as conventional copper wire, fiber optics, or wireless signals.

Figure 4:
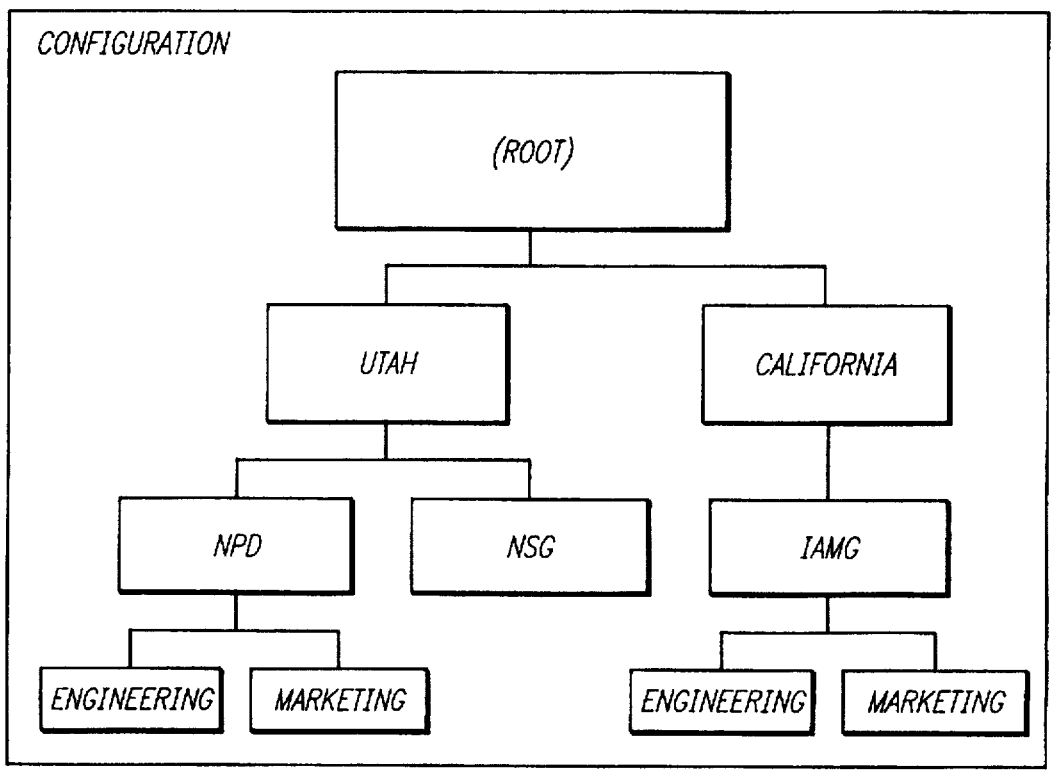
FIG. 4 is a block diagram illustrating an example configuration of a network serviced by a directory service.

Licensing system 100 suitably operates in conjunction with a directory service, such as NetWare Directory Services, for organization and location of various components. The directory service allows network 102 to be organized in a logical manner for administration, applications sharing, document sharing, and the like. For example, referring now to FIG. 4, the various servers 104 and clients 106 may be organized into divisions and subdivisions based on job description, geographical location, or other selected criteria. The directory service organization may be used to control and facilitate searching for licenses among the various LSPs 110, as described in greater detail below.

Each respective client 106 communicates with the various servers 110 over communications system 108. Client-server communications are suitably transport independent, for example using NCP extensions. Client communication components are preferably single sourced across all platforms to increase portability. For example, NWCalls from Novell may be used, which provides a platform independent mechanism for accessing Novell NetWare resources.

To communicate with LSP 110, client 106 first locates an LSP, and then communicate its request to LSP 110. Each LSP connected to communications system 108 suitably registers its handler 202. Consequently, when client 106 seeks LSP 110, it suitably scans its connections for an NCP handler 202 registered with the appropriate name.

Figure 5:
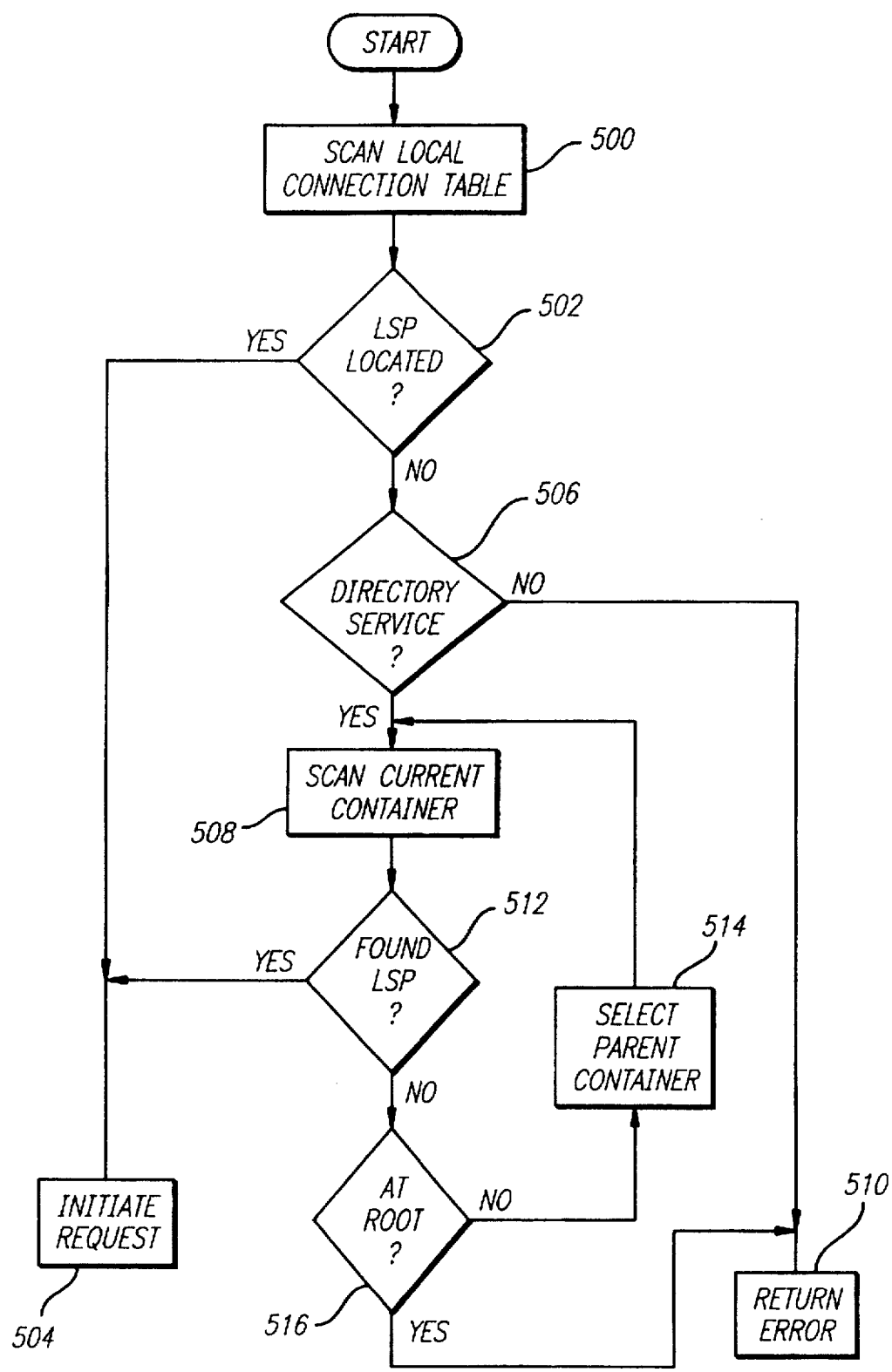
FIG. 5 is a flow diagram of a process for a client to locate an LSP.

For example, referring to FIG. 5, to locate an available LSP, client 106 suitably scans its local connection table for the NCP service name providing the licensing service (step 500). If an LSP 110 is located (step 502), client 106 initiates its request, suitably using an appropriate RPC (step 504). If an LSP 110 is not located, client 106 determines whether a directory service is available (step 506). If no directory service is available, an error arises indicating that no LSP 110 could be located (step 510).

If a directory service is available, the current directory context is scanned for available LSPs 110 (step 508). If no LSP 110 is located in the current container (step 512), client 106 begins searching the parent container (step 514). The search continues through the parents of the current container until the root is reached (step 526). If no LSPs 110 are found, client 106 receives an error indicating that licensing system 100 is not available (step 510). If an LSP 110 is found, client 106 connects to LSP 110 and transmits its request and continues its communications (step 504).

Figure 6:
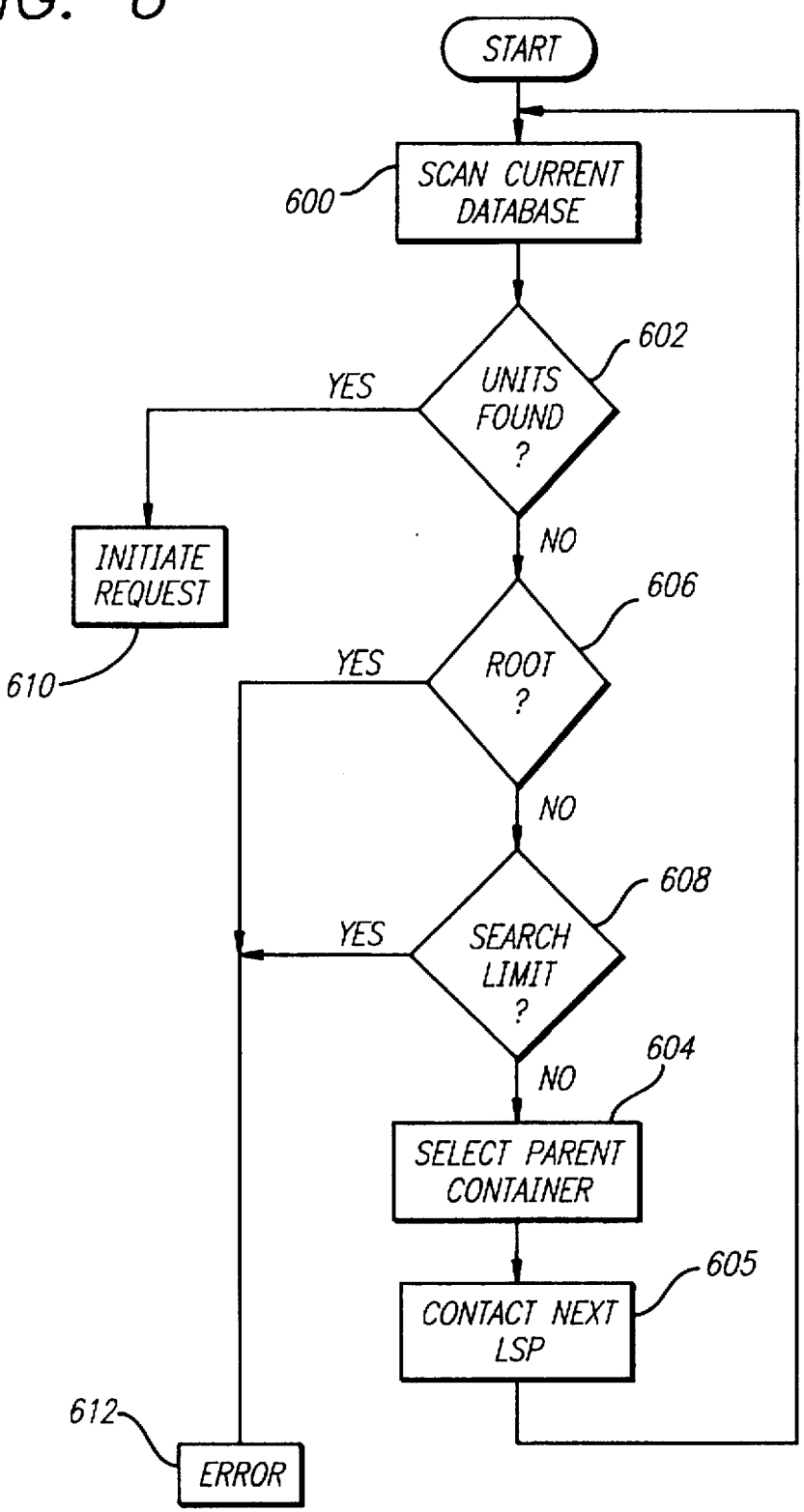
FIG. 6 is a flow diagram of a process for an LSP to locate another LSP.

Network 102 also suitably facilitates communications between the various servers 104. LSPs, 110 are suitably configured to provide a distributed license certificate database 112 available to each client 106. To provide the distributed database configuration, LSPs 110 are interconnected. Referring now to FIG. 6, to locate other LSPs 110 to, for example, find license units to fulfill a request, a first LSP 110 scans its current directory context for other LSPs 110 configured for license database attributes (step 600). LSP 110 can then communicate with any LSPs 110 located. If the necessary units are not located (step 602), LSP 110 then moves out one level in the directory context (step 604) and tries to contact LSPs (step 605), continuing until either the root is reached (step 606), the appropriate responses are received (step 602), or an administrator defined limit is reached (step 608). If none is found, an error is returned (step 612). If an LSP 110 is located, the request is initiated (step 610).

Each LSP 110 is suitably associated with various attributes which indicate the status of the particular LSP to the other LSPs 110. For example, suitable attributes include license database attributes, transactional database attributes, and an NCP pointer. The license database attribute indicates whether LSP 110 is configured to support a local license certificate database 112. Similarly, the transactional database attribute indicates whether LSP 110 is configured to support a transactional tracking system 210. The NCP pointer facilitates location of and communication with the corresponding NCP object.

To facilitate licensing of the various applications, a set of license information relating to licensed applications is installed in license certificate database 112. The license information is suitably provided by the vendor to facilitate access to applications. The information stored in the various license certificate databases 112 is suitably collectively available to each of LSPs 110. Consequently, each LSP 110 suitably stores different license information.

A license system 100 according to various aspects of the present invention allows various users to control entry and maintenance of licenses other than the administrator. When a user enters a license into the license system, the installer is considered the "owner" of the license. Only users having sufficient security clearance may modify or delete the installed license. Ownership of the license may also be transferred to other users.

When a license is installed in LSP 110, the administrator may assign a license to an individual, machine, group, container, or other selected users. The license certificate is then only available to a user with a security assignment corresponding to the certificate. The assignments are suitably additive, such that multiple groups, machines, users, or containers may be assigned to a single certificate. Similarly, licensing system 100 provides for removal of particular assignments, suitably one assignment at a time. In addition, each license certificate may be transferred to other LSPs 110. If the underlying structure of the particular network requires a single physical location for a license certificate, a function call is suitably provided for locating and moving the license certificate.

The information to support a license certificate in license certificate database 112 is suitably installed using a license creation utility. The license creation utility also suitably facilitates various management functions, such as modification of the default installation parameters, including adding additional LSPs 110 or activating and deactivating license certificate database 112 locations. The license creation utility allows the administrator to fit licensing system 100 to particular needs.

For simplicity, the license creation utility suitably includes a series of default installation parameters. For example, the license creation utility may include one or more license creation templates. License creation templates describe detailed policies for license generation and behavior at client 106. A series of default templates may be provided for implementing various standard licensing models. The license creation utility suitably prompts the installer, such as the administrator, for all information relating to the required entries, such as publisher, product, and version identifiers. In addition, the license creation utility may be adapted to request information suited to the particular network 102 or licensing system 100 configuration. For example, if security measures are desired, a number of secret codes, such as four, may be randomly selected and entered into the license information. These codes must be matched by the secret codes provided by client 106 to gain access to license units. All of this information is stored in a database file, which the installer maintains in confidentiality.

Figure 7:
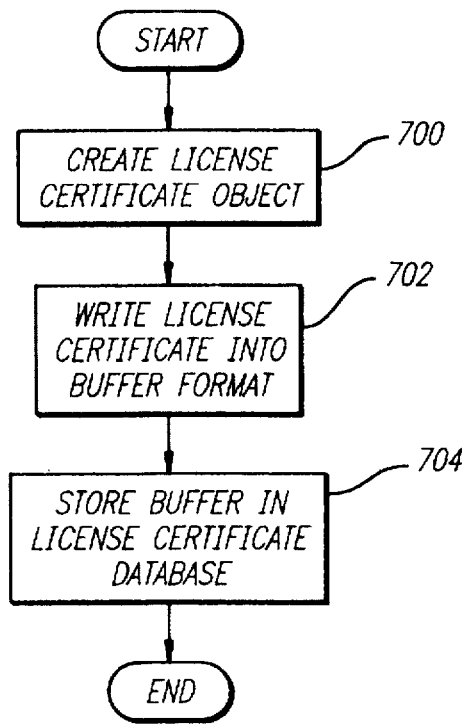
FIG. 7 is a flow diagram of a process for installing a license in the license certificate database.

Referring now to FIG. 7, upon receipt, license information is suitably stored as a collection of electronic license certificates, suitably in a common certificate binary format such as the format described above in conjunction with FIG. 3. To install the license information in license certificate database 112, database access system 208 uses the license information received from the installer to create a license certificate object to access the local license certificate database 112 (step 700). The license certificate object suitably includes embedded code which parses the license information and creates an executable entity. The license certificate object then executes, causing the license certificate object to be written into a buffer format recognized by LSP 110 (step 702). The particular format may be varied to suit the particular LSP or licensing system. LSP 110 then saves the formatted buffer into license certificate database 112, containing many other license certificates, all suitably in buffer form (step 704). The license certificate is then ready for retrieval.

As described above, various policy attributes for a license are stored in data field 308 associated with a particular license certificate. Data field 308 of each license record 302 installed in license certificate database 112 suitably stores a first group of information comprising required entries, and a second group of information comprising optional entries. The structure of the required entries is suitably common among each of the license certificates. The required entries describe the application's basic information. The optional entries, on the other hand, provide system specific enhancements to the standard policy.

The required entries suitably include fundamental information relating to the license certificate. For example, the required entries suitably include the publisher name, product name, version, number of license units, start date, and expiration date. The required entries also suitably include a unique identifier, such as a license or serial number, to distinguish the license from other licenses provided by the same publisher, product, and version. The required entries may also be configured to include various policy attributes to handle the consumption of license units and error conditions. A set of policy attributes may be included in the optional entries to describe various parameters of the license certificate. The policy attributes stored in data field 308 facilitate the detailed and flexible description of the license terms and conditions, for example including a number of license units tag, a default units to consume tag, or a default metered tag. The descriptors may also be configured to provide various default license schemes, such as concurrent licensing, nodelocked, personal use, site restricted, and one-time use. Any suitable attributes may be included, for example:

SHAREABLE: license units decremented on request, incremented on release.

DEFAULT UNITS DESCRIPTOR: defines the default number of units to consume for one request.

MINIMUM UNITS TO CONSUME: the minimum number of units to consume from this given license object despite the number requested.

MAXIMUM UNITS TO CONSUME: requesting over this amount of units generates an error.

It should be noted that the optional entries preferably do not provide more restrictive policy than the required fields to eliminate incentive to install the license certificate on a less restrictive LSP.

Similarly, other attributes that may be included relate to the behavior of the system in the event of a particular error condition, which are referred to as error handling attributes. Each error handling attribute suitably describes a reaction based on conditions encountered in the acquisition of license units. These actions may be provided with parameters to control the particular reaction. For example, for demonstration purposes, an error handling attribute may allow access to an application even if no units have been installed. Certain parameters may be installed to provide limited access, however, to limit the user's access to the application.

In addition, the required entries suitably include security information, such as encrypted authentication information. An application may be licensed with no security attributes at all. Alternatively, security attributes may be stored in data field 308, and different attributes may be provided to generate different levels of security. For example, the vendor may use the common certificate security format, which utilizes certain "secrets" incorporated into the license acquisition API to prevent unauthorized modification of the license certificate. The license acquisition API's secretes comprise a set of encrypted information, such as the license information plus an activation key, which are provided by a client to gain access to an application. As added protection, a standard RSA public/private key digital signature may be offered for higher end security. In addition, an attribute may be added which requires the presence of a particular hardware security device, often referred to as a "dongle", to activate the application. Information relating to such security attributes may be included in data field 308.

The optional entries of data field 308 may further include information relating to particular licensing systems 100. For example, data field 308 suitably includes a system specific area tag. This tag may include a unique tag associated with a particular licensing system 100, along with any information pertinent to that licensing system 100. A license certificate object encountering an unrecognized tag in this field may ignore the tag and continue processing the remainder of the information. All policy attributes are preferably additive so that they may be combined in any manner suited to the vendor or administrator to create an overall description of the application's behavior.

Figure 8B:
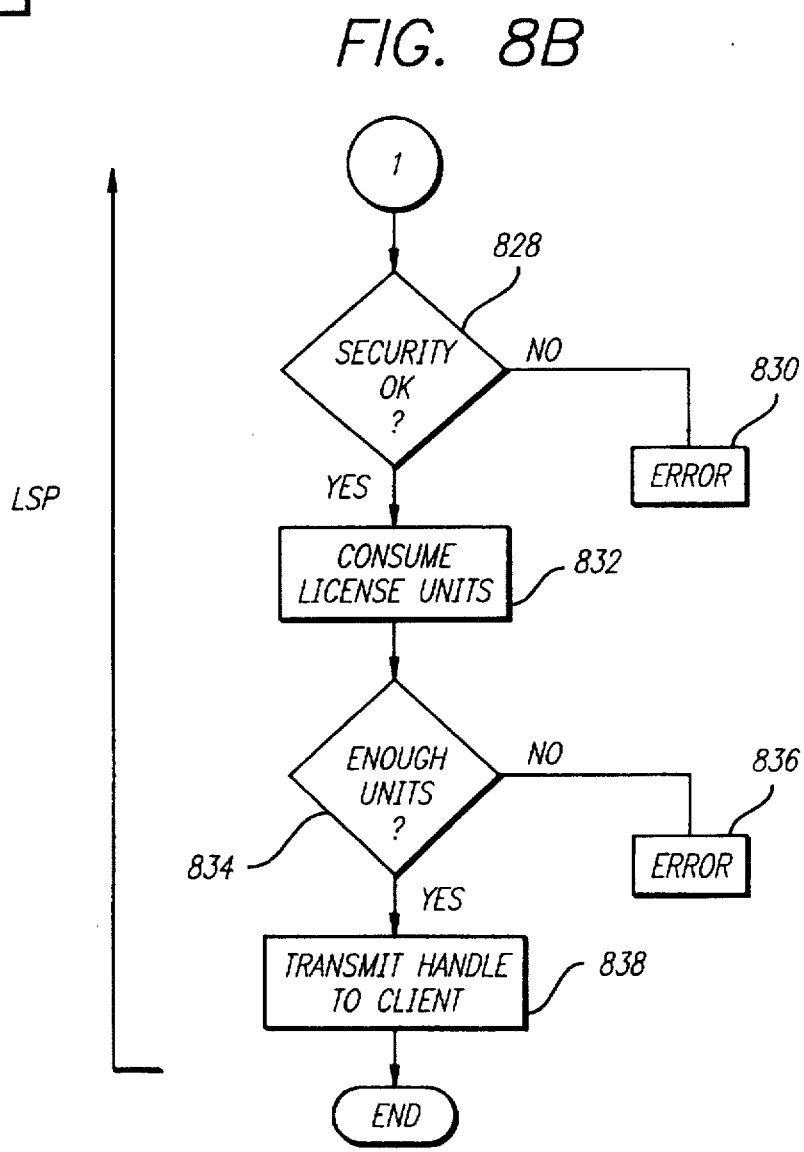
FIGS. 8A–B comprise a flow diagram of a process for requesting and generating a license for an application.
Figure 8A:
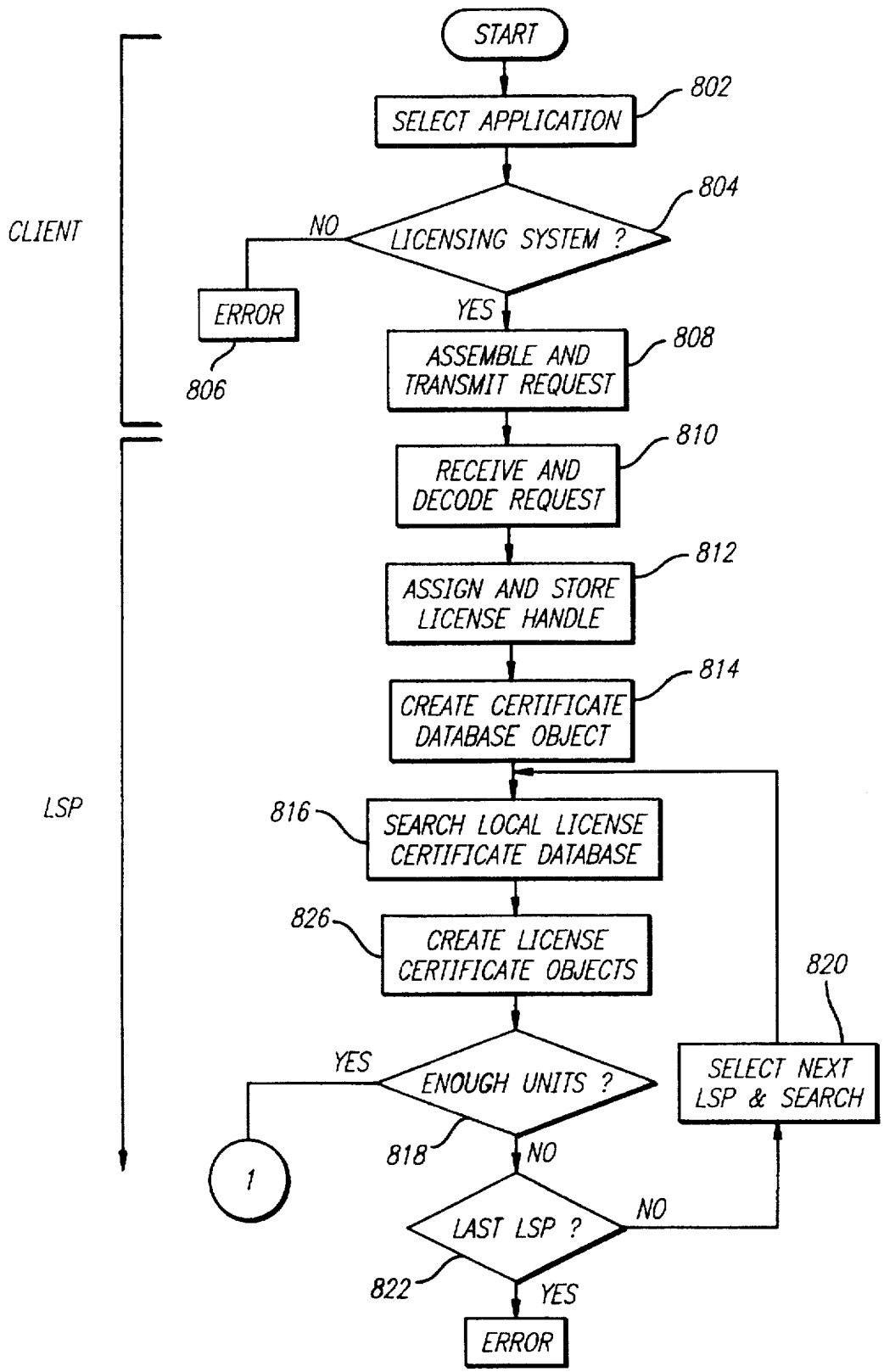

After the license certificates have been added to license certificate database 112 and stored in buffer format, client 106 may request licenses for access to applications. Referring now to FIGS. 8A–B, when the user desires an application, the user suitably chooses a license by selecting a name from a list or an icon, and then provides suitable information corresponding to any required fields (step 802). If all information is predetermined, no further information may be required. An output destination from which the request is made is also automatically inserted into the request.

Client 106 initially checks for a connection to a compatible licensing system 100 (step 804). If none is found, an error code is returned (step 806). If licensing system 100 is available, client 106 bundles the request arguments for the function, along with a function number, into a buffer, and uses the RPC mechanism furnished by the client provider to send the request to LSP 110 (step 808). The request is generated using the license acquisition API and suitably specifies particular information relating to the application, such as the publisher, product, and version for which license units are requested. In addition, the API suitably indicates the number of license units requested, so that the number of units consumed is specified by the API. Client 106 transmits the request to LSP 110 and waits for a response.

LSP 110 receives the request for a number of license units from client 106 (step 810). The particular LSP 110 receiving the request is suitably the nearest LSP, but may be any LSP in the network. The handler 202 of LSP 110 receives the request and transmits it to parser 204. Parser 204 transmits the parsed request to implementation translator 206, which decodes the request. The request is transmitted to transaction tracking system 210, which grants a licensing handle describing the start of a new transaction (step 812). The license handle is stored in the transaction database, along with other information associated with the license request. For example, the user's NDS distinguished name and the application publisher, product, and version may be entered into the transaction database and associated with the license handle. Any calls made by client 106 utilizing the particular license handle are then logged as action corresponding to that license handle. An action corresponding to a license handle suitably records relevant information in the transaction database, such as what call was made, time of the call, number of units involved, and the outcome of the call.

Implementation translator 206 also provides the decoded request to database access system 208, which creates a certificate database object to search license certificate database 112 (step 814). The certificate database object uses the information from implementation translator 206 to find units conforming to the request criteria. For example, the certificate database object suitably receives a combination of publisher name, product name, version, and license handle. The certificate database object searches the local license certificate database 112 for one or more license certificates which could fulfill the request, i.e., relate to the appropriate application (step 816). The user's login information is suitably used for accessing the various license records in the database. The certificate database object provides direct access to each license record without regard to the underlying certificate's policy attributes. The certificate database object selects a first license record and determines whether the license record is compatible with the request. If so, the certificate database object creates a license certificate object using the information in the buffer. The license certificate object suitably determines whether the license units corresponding to the license record are available to the requesting client by reviewing, for example, the policy attributes of the license, the user information associated with the request, any existing license assignments, and the raw number of units originally installed. This is performed before actually obtaining the license to determine whether all of the required license units are available.

The certificate database object checks each license record in the database until sufficient records are accumulated. If compatible license records are found in the present database, LSP 110 constructs license certificate objects from the buffers matching the publisher, product, and version fields (step 826). The license certificate objects are queried to determine whether enough units have been accumulated to fulfill the request (step 818). If the request cannot be fulfilled using the local databases, the certificate database object is transmitted to other available LSPs 110 (step 820). To search for license units, the directory is suitably searched by searching up through the parents of the current container, then searching all siblings of each of the parents previously visited in the search. This optimizes access to parent containers because the sibling containers are searched after all of the parents. This optimization, in a typical network, increases performance for commonly utilized application because the licenses are likely to be stored in a main parent container.

Each LSP 110 also suitably has the authority to reject requests from other LSPs 110 outside of a specified context. The default context is suitably the tree under which LSP 110 is running. Licensing system 100 may be configured, however, by the administrator according to the needs of the particular system.

If all of the available LSPs 110 have been searched (step 822) and the appropriate license units cannot be located, LSP 110 returns an error message to client 106 (step 824). If the appropriate buffers are available among the various LSPs, the license certificate objects consume the detected license units. To consume the units, each license certificate object checks the license information for any existing assignments. If an assignment exists on the license certificate, it performs a security equivalency check to determine whether the requesting client 106 is among those assigned to the license certificate (step 828). If no match is found, the license certificate object returns an error to the requesting client (step 830).

If a match is found, the license certificate object consumes the license units by updating the buffer with the user information, license handle, and how many units are to be consumed (step 832). The various buffers in license certificate database 112 are modified to indicate that various attributes have been incorporated into a license certificate object. For example, if only a limited number of users may use an application simultaneously, then the value in the buffer corresponding to the number of units available is decremented by the number of units accorded to the license certificate object. All such modification of the buffers are performed according to the policy attributes associated with the license certificate.

The license certificate object acquisition process continues to request units from buffers until all of the required buffers are obtained or the necessary buffers to proceed cannot be found. If insufficient license units were located (step 834), a detailed error code indicating the grounds for denial of the request is returned to client 106 and stored in the transactional database (step 836). If the appropriate buffers are located, however, the license certificate object suitably grants the license based on the various policy attributes. The resulting license is suitably shipped to client 106, suitably in binary form along with the application and the license handle (step 838). When client 106 receives a response, it removes the output arguments from the output buffer, and sends the results back to the calling application.

Client 106 suitably periodically updates the license handle within the specified update period. For example, the appropriate update period may be obtained by the application using a licensing function call. In response, LSP 110 suitably returns an appropriate update period, such as the shortest update period specified by any of the stored license certificates. Updating the license handle suitably comprises a message sent to LSP 110 indicating continued use of the application. If the update fails to occur, LSP 110 treats the failure as a return of the license units. Consequently, the license units are reinstated into license certificate database and become available for use by other clients, if appropriate, based on the particular licensing policy. The application is also disabled for the requesting client 106. The update requirement provides for abnormal termination of the application and license, such as in the event of a system crash or power loss.

When client 106 no longer requires the license units, the application transmits a release notification to LSP 110. When the release message is received by LSP 110, the license certificate object marks each of the license certificates associated with the particular license handle as no longer in use. If the policy attributes permit, the license units may then be designated as available. LSP 110 then communicates the release to all of the appropriate LSPs 110, and the transaction is complete.

A licensing system according to various aspects of the present invention may also be suitably configured to provide several software metering facilities. Software metering essentially comprises enabling an application using an intermediary application. Instead of the application directly requesting a license from LSP 110, the request is placed by the intermediary application. The intermediary application monitors usage of executables, and when it detects the usage of a "metered" executable, it requests a license from LSP 110 on behalf of the executing application. The intermediary application first maps the executable name to a publisher, product, and version name, and then requests the licensing units from LSP 110 using the standard function calls.

The intermediary application is suitably capable of requesting a fully enabled license certificate from licensing system 100. The security features, however, may be disabled, especially for a trusted environment; no security against forgery is typically required because the end user creates the license utilized by the intermediary application. In addition, the metering function typically allows unlimited access to the metered application.

When the intermediary application accepts a request for an application, the intermediary application enters the information about the product into licensing system 100. This includes all of the information contained in a typical license certificate, including the number of units and any policy descriptions which help describe the license attributes. A licensing function call is provided in the intermediary application which allows the software management system to directly enter information into the license database. The function call suitably allows entry of all information relevant to the product, including the publisher, product, version, units, and policy attributes. Security information, however, is typically not facilitated through the intermediary application, which allows the metering information to be distinguished from information obtained by the installation of license certificates created by a manufacturer. This also provides security against an end user directly entering information for a vendor licensed application which requires a vendor supplied license certificate. The metering utility is also suitably responsible for mapping an executable name to a publisher, product, and version. The software management system is also suitably responsible for gathering the information about application to be metered and for performing the call which translates that information into licensing system's 100 database.

The software metering system configuration is particularly useful to determine the usage of individual applications in an enterprise network environment, which applications are installed on a network, and which users are using them. In addition, it is often desirable for licensing system 100 to inform the administrator of any error conditions which may have occurred during the execution of any relevant software. Tracking software usage is facilitated by the transaction tracking system 210, which is suitably organized such that all actions performed by a single application in a particular execution session and utilizing a particular license certificate are grouped together. The software asset management system may read entries from the transaction database through a set of function calls. The database is suitably chronologically organized based on the time at which the first action in a transaction occurred. Examples of actions to be recorded include the request for license units, granting of license units, updates, and release of license units. The individual entries in the transaction database may be assembled into the required usage information and presented to the user or administrator. Similarly, information regarding errors are also placed in the transaction database. Errors are suitably recorded in the transaction record of the application which generated the error condition. Every transaction entry, including requests and errors, suitably contains information about the user which generated the action. Consequently, the administrator may track which users are not appropriately authorized or are suffering multiple error conditions.

An electronic licensing system according to various aspects of the present invention thus provides a distributed database among several servers. As a result, any given server is unlikely to be overloaded as a licensing server. In addition, license information may be coupled with any desired attributes to create a desired licensing policy. Because the client merely bundles the arguments for a license request and transmits them to the server, client resources are preserved. In addition, recoverability of the system is enhanced. All pertinent information is stored in the license certificate database. To reestablish the license application, the client only needs to store the license handle associated with the license request.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

It is claimed:

1. An electronic licensing system for providing access to a plurality of applications in a computer network environment, comprising:
    a license database configured to store authorization parameters relating to usage of the plurality of applications; and
    a license service provider configured to receive requests, search said license database for authorization parameters corresponding to said received request, and facilitate access to the application only if the corresponding authorization parameters are stored in said license database; and
    a client configured to generate a request for access to one of said plurality of applications and transmit said request to said license service provider, wherein said client includes an API configured to generate said request, and said request includes:
        a generic request structure for requesting access to any of said plurality of applications, and
        at least one identification parameter embedded in said generic structure corresponding to said requested application.

2. The electronic licensing system of claim 1, wherein said at least one identification parameter includes a publisher indicator, a product indicator, and a version indicator.

3. The electronic licensing system of claim 1, wherein said license service provider is configured to generate a certificate database object configured to search said license database for said authorization parameters.

4. The electronic licensing system of claim 3, wherein:
    said license database comprises a distributed database distributed over a plurality of computers; and
    said certificate database object is configured to search a first memory associated with a first computer of said plurality of computers for said authorization parameters and search a second memory associated with a second computer of said plurality of computers only if said authorization parameters are not stored in said first memory.

5. The electronic licensing system of claim 1, wherein said authorization parameters are stored in said license database according to a uniform format.

6. The electronic licensing system of claim 1, further comprising a transaction database configured to store information relating to said request.

7. The electronic licensing system of claim 6, wherein said license service provider is configured to assign a unique identifier to said request and store said unique identifier in said transaction database.

8. An electronic licensing system for providing access to a plurality of applications in a computer network environment, comprising:

a client configured to generate a request for at least one of the plurality of applications, wherein said client includes an API configured to generate said request;

a license database configured to store authorization parameters relating to usage of the plurality of applications, wherein said authorization parameters are stored on a plurality of computers; and a license service provider configured to receive said request from said client and generate a certificate database object based on said request, wherein said certificate database object is configured to search said license database for authorization parameters corresponding to said received request and facilitate access to the application only if the corresponding authorization parameters are stored in said license database.

9. The electronic licensing system of claim 8, wherein said request includes a product indicator, a version indicator, and a source indicator corresponding to the requested application.

10. The electronic licensing system of claim 8, wherein said certificate database object is configured to search a first memory associated with a first computer of said plurality of computers for said authorization parameters and search a second memory associated with a second computer of said plurality of computers only if said authorization parameters are not stored in said first memory.

11. The electronic licensing system of claim 8, wherein said authorization parameters are stored in said license database according to a uniform format.

12. The electronic licensing system of claim 8, further comprising a transaction database configured to store information relating to said request.

13. The electronic licensing system of claim 12, wherein said license service provider is configured to assign a unique identifier to said request and store said unique identifier in said transaction database.

14. An electronic licensing system for providing access to a plurality of applications in a computer network environment, comprising:

a client configured to request at least one of the plurality of applications 18, wherein said client includes an API configured to generate said request;

a license database configured to store authorization parameters relating to usage of the plurality of applications;

a certificate database object configured to search said license database for authorization parameters corresponding to said client request; and a transaction database configured to store information relating to said access.

15. The electronic licensing system of claim 14, wherein said request includes a product indicator, a version indicator, and a source indicator.

16. The electronic licensing system of claim 14, wherein:

said license database comprises a distributed database distributed over a plurality of computers; and said certificate database object is configured to search a first memory associated with a first computer of said plurality of computers for said authorization parameters and search a second memory associated with a second computer of said plurality of computers only if said authorization parameters are not stored in said first memory.

17. The electronic licensing system of claim 14, wherein said authorization parameters are stored in said license database according to a uniform format.

18. A method of providing access to software applications in a computer network environment, comprising the steps of:

storing a plurality of authorization parameters relating to the applications in a license database distributed across a plurality of computers, wherein said step of storing said plurality of authorization parameters includes the steps of:
  creating a local license certificate database in each of said plurality of computers;
  writing authorization parameters associated with each of the applications into a buffer format; and
  storing said formatted authorization parameters into said local license certificate databases;

requesting access to at least one of said applications;

searching said license database for authorization parameters corresponding to said requested access; and facilitating access to said application only if said corresponding authorization parameters are stored in said license database.

19. The method of claim 18, further comprising the steps of:

assigning a license handle to said requested access;

storing said license handle in a transaction database; and providing said license handle to the source of said requested access.

* * * * *